United States Patent [19]
Archer et al.

[11] 3,728,352
[45] Apr. 17, 1973

[54] PHENYLALKYLAMINOTETRAHYDRO ISOQUINOLINES

[75] Inventors: Sydney Archer; John W. Schulenberg, both of Bethlehem, N.Y.

[73] Assignee: Sterling Drug Inc., New York, N.Y.

[22] Filed: Apr. 8, 1970

[21] Appl. No.: 26,765

Related U.S. Application Data

[60] Division of Ser. No. 826,681, May 21, 1969, Pat. No. 3,557,120, which is a continuation-in-part of Ser. No. 569,021, Aug. 1, 1966.

[52] U.S. Cl. ..........................260/287 R, 260/288 R
[51] Int. Cl. .......................C07d 35/36, C07d 35/38
[58] Field of Search ......................260/288 R, 287 R

[56] References Cited

UNITED STATES PATENTS

| | | | |
|---|---|---|---|
| 3,042,671 | 7/1962 | Lombardino | 260/288 R |
| 3,452,010 | 6/1969 | Pohlke | 260/288 R |
| 3,476,755 | 11/1969 | Taylor | 260/288 R |
| 3,393,195 | 7/1968 | Thesing | 260/288 X |
| 3,557,120 | 1/1971 | Archer et al. | 260/288 |

OTHER PUBLICATIONS

R. Yamazari in Chem. Abstr., Vol. 54, Col. 5678–5679 (1960)

*Primary Examiner*—Donald G. Daus
*Attorney*—Elmer J. Lawson, B. Woodrow Wyatt, Thomas L. Johnson, Robert K. Bair, William G. Webb and Roger T. Wolfe

[57] ABSTRACT

Reaction of a 1-aminomethyl-1,2,3,4-tetrahydro-6,7-dimethoxyisoquinoline with an aldehyde or ketone effects ring-closure to an imidazo compound, viz., a 1,2,3,5,6,10b-hexahydro-8,9-dimethoxyimidazo[5,1-a]isoquinoline and alkaline treatment of the related 1-[N-(α-halo lower-alkanoyl)]aminomethyl-2-benzyl-1,2,3,4-tetrahydro-6,7-dimethoxyisoquinoline effects ring-closure to a pyrazino compound, viz., a 1,3,4,6,7,11b-hexahydro-9,10-dimethoxy-2H-pyrazino[2,1-a]isoquinoline. The final products possess sedative, tranquilizing and related pharmacodynamic effects.

10 Claims, No Drawings

PHENYLALKYLAMINOTETRAHYDRO ISOQUINOLINES

This application is a division of our copending application Serial No. 826,681, filed May 21, 1969, now U.S. Pat. 3,557,120 which is in turn a continuation-in-part of our application Serial No. 569,021, filed August 1, 1966, copending with said application Serial No. 826,681 and now abandoned.

Our invention relates to derivatives of 1,2,3,4-tetrahydro-6,7-dimethoxyisoquinoline, to intermediates for the same, to derivatives of the invermediates and to the preparation thereof.

The novel compounds of this invention are defined by the structural formula

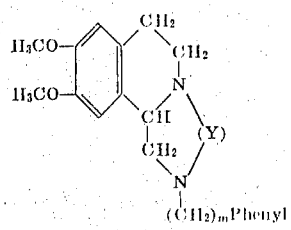

I in which Y is 1:1 or 1:2 alkylene of up to (and including) six carbon atoms and m is zero, one or two.

More specifically, the compounds of our invention are 2-[phenyl($CH_2$)$_m$]-3-($R^1$,$R^2$)-1,2,3,5,6,10b-hexahydro-8,9-dimethoxyimidazo[5,1-a]isoquinolines, having in the free base form, the formula

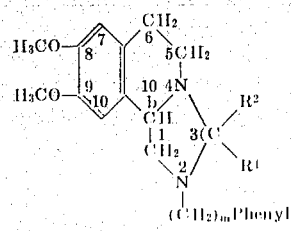

II and 2-[phenyl($CH_2$)$_m$]-3-($R^1$,$R^2$)-1,3,4,6,7,11b-hexahydro-9,10-dimethoxy-2H-pyrazino[2,1-a]isoquinolines which, in the free base form, are defined by the formula

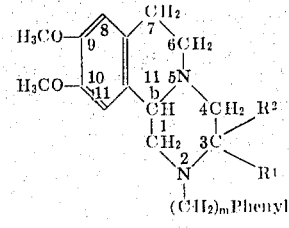

III and 2-[phenyl($CH_2$)$_m$]-4-($R^1$,$R^2$)-1,3,4,6,7,11b-hexahydro-9,10-dimethoxy-2H-pyrazino[2,1-a]isoquinolines defined, in the free base form, by the formula

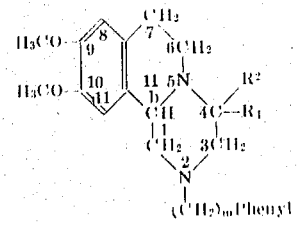

IV

In each of the furmulas, II, III, and IV, m has the meanings given hereinabove. The symbols $R^1$ and $R^2$ used in formulas II, III, and IV, represent hydrogen or lower-alkyl of up to (and including) five carbon atoms.

As used herein, the term "1:1 alkylene" means an alkylene group having both free valence bonds on the same carbon atom, as illustrated by, but not limited to, methylene, 1,1-ethylene, 1,1-propylene, 2,2-propylene, 1,1-butylene, 2,2-butylene, 1,1-isobutylene, 1,1-neopentylene, 3,3-hexylene, and the like, and "1:2 alkylene" means an alkylene group having one free valence bond on one carbon atom and the other on the carbon atom adjacent to the said carbon atom, as illustrated by, but not limited to, 1,2-ethylene, 1,2-propylene, 2,3-butylene, 1,2-isobutylene, 2,3-hexylene, 2,3-isopentylene, 1,2-neohexylene, and the like.

As used throughout, the term "lower-alkyl" means saturated, monovalent hydrocarbon groups including straight and branched-chain groups as illustrated by, but not limited to, methyl, ethyl, n-propyl, isopropyl, n-butyl, sec-butyl, and the like. Lower-alkyl groups of from one to three carbon atoms are preferred.

The benzene ring of the terms "phenyl", "phenyl-lower-alkyl", and "phenyl($CH_2$)$_m$" as used throughout this disclosure can bear any number and kind of substituents such as would occur to those skilled in the art. The presence of such substituents on the benzene ring does not adversely affect the pharmocological activity of the compositions of this invention. Preferred among such substituted-benzene rings are, without limiting the generality of the foregoing, monosubstituted phenyl wherein the substituent is in any of the possible orientations in the ring, for example, lower-alkylphenyl, e.g., methylphenyl, ethylphenyl, isopropylphenyl; halophenyl, e.g., fluorophenyl, chlorophenyl, bromophenyl, iodophenyl; lower-alkoxyphenyl, e.g., methoxyphenyl, ethoxyphenyl, butoxyphenyl; trifluoromethylphenyl; lower-alkylthiophenyl, e.g., methylthiophenyl, butylthiophenyl; or N,N-di-lower-alkylaminophenyl, e.g., N,N-dimethylaminophenyl, N-methyl-N-ethylaminophenyl. In the aforementioned groups, lower-alkyl or lower-alkoxy can have from one to four carbon atoms. Thus the term "Phenyl" in Formulas I through XVII can be either unsubstituted or substituted by a member of the group consisting of lower-alkyl, lower-alkoxy, halogen, halo-lower-alkyl, lower-alkylthio or N,N-di-lower-alkylamino.

The term "phenyl-lower-alkyl" as used throughout means a monovalent radical consisting of the phenyl nucleus bonded to the rest of the molecule through a divalent lower-alkylene radical of from one to four carbon atoms as exemplified by, but not limited to, methylene, 1,2-ethylene, 1,2-ethylene, 1,3-propylene, 1,2-propylene, 1,4-butylene, and the like. Thus, solely for illustration and without limitation, examples of phenyl-lower-alkyl are phenylmethyl, 1-phenylethyl, 2-phenylethyl, 3-phenylpropyl, and the like.

Pharmocological evaluation of the compounds of Formulas II, II, and IV has shown that they possess pharmoco-dynamic properties, in particular, central nervous system depressing, sedative, and anti-convulsant activities thus indicating their usefulness as C.N.S. depressants, sedatives, and anti-consulsants.

C.N.S. depressant activity for the compounds of the instant invention was determined in standard activity cages using the method of Dews, Brit. J. Pharmocol., 8, 46(1953) in which mice, medicated with the test compounds, are placed in wire mesh cages equipped with a photoelectric cell so adjusted that a mouse breaking the beam activates a magnetic digital counter. Thus the number of times the light beam is broken over a period of time is an indication of the motor activity of the animals, and a reduction in the number of counts in the medicated mice over control groups, run simultaneously, is taken as evidence of psychomotor depressant activity. The dose at which such reduction in motor activity was observed was recorded as the active dose. Thus when administered by the oral route in doses of from about 100 to about 300 milligrams per kilogram of body weight the 2-[phenyl$(CH_2)_m$]-3-($R^1$, $R^2$)-1,2,3,5,6,10b-hexahydro-8,9-dimethoxy-imidazo[5,1-a]isoquinolines of Formula II and the 2-[phenyl$(CH_2)_m$]-3(or 4)-($R^1$, $R^2$)-1,3,4,6,7,11b-hexahydro-9,10-dimethoxy-2H-pyrazino-[2,1-a]isoquinolines of Formula III and IV decreased the spontaneous activity of the mice by about 60 to about 85 percent. The preferred imidazo[5,1-a]isoquinoline of our invention, 2-phenyl-1,2,3,5,6,10b-hexahydro-8,9-dimethoxy-imidazo[5,1-a]isoquinoline, described below in Example 1, was found to decrease spontaneous activity by about 70 percent at a dose level of 300 mg./kg.(p.o.). The preferred pyrazino [2,1-a]isoquinolines of the instant invention, 2-phenethyl-1,3,4,6,7,11b-hexahydro-9,10-dimethoxy-2H-pyrazino[2,1-a]isoquinoline dihydrochloride, described in Example 11, and 2-phenyl-1,3,4,6,7,11b-hexahydro-9,10-dimethoxy-2H-pyrazino[2,1-a]isoquinoline dihydrochloride described in Example 9, were found to decrese spontaneous activity by about 60 percent and about 80 percent respectively at dose levels of 100 mg./kg.

Sedative activity of the compounds was determined using the standard hexobarbital potentiation test which is described briefly as follows. The compounds, in the form of their hydrochloride salts in distilled water, were administered either orally or intraperitoneally into three groups of ten white Swiss mice at each of three different dose levels graduated in geometric progression in multiples of two. 40 minutes after medication, the animals were each administered a subhypnotic dose of 40 mg./kg. of hexobarbital given either orally (p.o.) or intraperitoneally (i.p.). The animals in each group were then examined every five minutes for a period of fifteen minutes for loss of the righting relfex. The number of animals in each group that suffered loss of the righting reflex for at least one minute was noted, and such compounds were considered active, and the dose which produced loss of the righting reflex in fifty per cent of the animals was called the Effective Dose$_{50}$ (ED$_{50}$). Thus 2-phenyl-1,2,3,5,6,10b-hexahydro-8,9-dimethoxy-imidazo-[5,1-a]isoquinoline, described in Example 1 below, was found to be active at 100 mg./kg. (p.o.) and 2 phenyl-1,3,4,6,7,11b-hexahydro-9,10-dimethoxy-2H-pyrazino[2,1-a]isoquinoline described in Example 9 below was found to have an ED$_{50}$ of 30 ± 7.4 mg./kg.

Anticonvulsant activity was determined using the standard maximal metrazol-induced seizures procedure described by Goodman et al., J. Pharm. Exp. Therap. 108, 168 (1953). In this procedure, convulsions are induced in untreated mice by the intravenous injection of 50 mg./kg. of metrazol. A group of ten mice is pretreated with the substance to be tested 30 minutes before receiving metrazol intravenously, and the animal is considered protected and the drug active is the drug prevents the hindleg tonic extensor component of the seizure. The dose which protects 50 percent of the treated animals for a period of ninety minutes after medication is called the Effective Dose$_{50}$ (ED$_{50}$). Thus 2-phenethyl-1,3,4,6,7,11b-hexahydro-9,10-dimethoxy-2H-pyrazino[2,1-a]isoquinoline dihydrochloride, described in Example 11 below, was found to prevent the hindleg tonic extensor component of the seizure at a dose level of 50 mg./kg. (i.p.) and the ED$_{50}$ of 2-phenyl-1,3,4,6,7,11b-hexahydro-9,10-dimethoxy-2H-pyrazino[2,1-a]isoquinoline dihydrochloride, described in Example 9 hereinbelow, was found to be 57 mg./kg. (i.p.).

The compounds of formula II, III and IV were found to be pharmacologically active at dose levels well below dose levels manifesting evidence of acute toxicity.

The actual determination of the numerical biological data definitive for a paticular compound is readily obtained by the above-described standard test procedures by technicians trained in pharmacological test methods, without the need for any extensive expermentation.

The 2-[phenyl$(CH_2)_m$]-3-($R^1$,$R^2$)-1,2,3,5,6,10b-hexahydro-8,9-dimethoxy-imidazo[5,1-a]isoquinolines of Formula II, are conveniently prepared by the reaction of 1-[N-(phenyl-$(CH_2)_m$)]aminomethyl-1,2,3,4-tetrahydro-6,7-dimethoxyisoquinoline, as represented by the formula

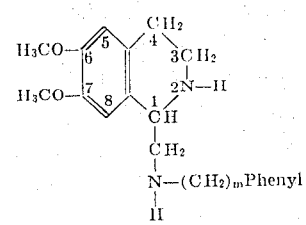

wherein m is zero, one or two, with a carbonyl compound such as an aldehyde or a ketone. The reaction is preferably carried out at a temperature between about 25°C. and about 150°C. in a lower-alkanol or lower-alkylene glycol, for example, methanol, ethanol, and ethylene glycol. A preferred solvent is ethanol.

The intermediate, 1-[N-(phenyl$(CH_2)_m$)]aminomethyl-1,2,3,4-tetrahydro-6,7-dimethoxyisoquinoline, of formula V, can be prepared by lithium aluminum hydride reduction of N-[phenyl$(CH_2)_m$]-1,2,3,4-tetrahydro-6,7-dimethoxy-1-isoquinolinecarboxamide of the formula

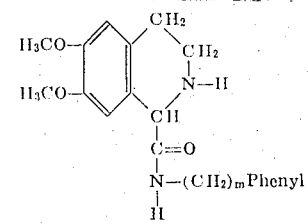

in which m is zero, one or two.

Alternatively, the compounds of formula II can be obtained by reduction with lithium aluminum hydride of 1-oxo-2-[phenyl$(CH_2)_m$]-3-($R^1$,$R^2$)-1,2,3,5,6,10b-hexahydro-8,9-dimethoxy-imidazo[5,1-a]isoquinoline of the formula

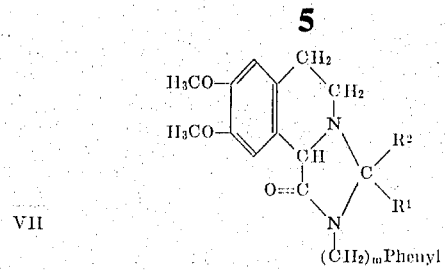

VII wherein m, R¹ and R² have the meanings given above. The reaction with lithium aluminum hydride is preferably carried out at a temperature between about 10°C. and about 100°C. in diethyl ether, tetrahydrofuran or dioxane.

The intermediate, 1-oxo-2-[phenyl(CH₂)$_m$]-3-(R¹,R²)-1,2,3,5,6,10b-hexahydro-8,9-dimethoxy-imidazo[5,1-a]isoquinoline (VII), is conveniently prepared by the reaction of N-[phenyl(CH₂)$_m$]-1,2,3,4-tetrahydro-6,7-dimethoxy-1-isoquinolinecarboxamide (VI), with a carbonyl compound such as an aldehyde or a ketone. The reaction is preferably carried out at a temperature between about 25°C. and about 150°C. in a solvent inert under the condition of the reaction, for example, methanol, ethanol and ethylene glycol. A preferred solvent is ethanol.

The N-[phenyl(CH₂)$_m$]-1,2,3,4-tetrahydro-6,7-dimethoxy-1-isoquinolinecarboxamide (VI) used as an intermediate in preparing the imidazoisoquinolines and the pyrazinoisoquinolines of our invention, is prepared by reacting ethyl 1,2,3,4-tetrahydro-6,7-dimethoxy-1-isoquinolinecarboxylate, known in the prior art, with phenyl(CH₂)$_m$amine, wherein m has the meanings given hereinabove. The reaction is preferably carried out at a temperature between about 75°C. and 225°C. either without a solvent or with a solvent inert under the conditions of the reaction. Such solvents are, for example, benzene, toluene, or xylene. It is preferable, but not necessary, to carry out the reaction under an atmosphere of nitrogen, and in the presence of a sodium or potassium alkoxide, for example, potassium tert-butoxide.

Alkylated ring-nitrogen derivatives of the intermediate, N-[phenyl(CH₂)$_m$]-1,2,3,4-tetrahydro-6,7-dimethoxy-1-isoquinolinecarboxamide, represented by the formula

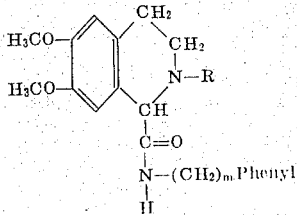

VIII and of the intermediate, 1-[N-(phenyl(CH₂)m)]1,2,3,4-tetrahydro-6,7-dimethoxyisoquinoline represented by the formula

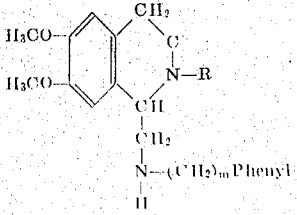

IX where in both formulas R is lower-alkyl or phenyl-lower-alkyl, can be prepared by the reaction of the compounds of formula VI and formula V respectively, with lower-alkyl and phenyl-lower-alkyl esters of strong mineral acids. By way of illustration and without being limited thereto, there can be mentioned lower-alkyl chlorides, lower-alkyl bromides, phenyl-lower-alkyl bromides, lower-alkyl sulfates, phenyl-lower-alkyl sulfates, and the like. Alternatively, lower-alkyl and phenyl-lower-alkyl esters of stron organic sulfonic acids can be used, for example, lower-alkyl and phenyl-lower-alkyl methanesulfonates and toluenesulfonates. The reaction is preferably carried out in refluxing acetonitrile in the presence of sodium carbonate.

When 1-[N-(phenyl(CH₂)m)]aminomethyl-1,2,3,4-tetrahydro-6,7-dimethoxyisoquinoline (V) is reacted with an °-halo lower-alkanoyl halide at a temperture of about −10°C. to 10°C. in the presence of anhydrous sodium carbonate, and in a solvent inert under the conditions of the reaction, there is obtained 1-[N-(α-halo lower-alkanoyl)-N-(phenyl(CH₂)$_M$)]aminomethyl-2-(α-halo lower-alkanoyl)-1,2,3,4-tetrahydro-6,7-dimethoxyisoquinoline of the formula

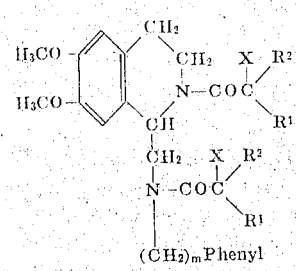

X wherein R¹ and R² are hydrogen or lower-alkyl, m is zero, one or two, and X is bromine or chlorine. Suitable solvents for this reaction are, for example, chloroform, methylene dichloride, carbon tetrachloride, andthe like.

As used herein the te m "α-halo lower-alkanoyl" includes both straight and branched-chain radicals of from two to six carbon atoms inclusive as illustrated by, but not limited to, α-chloroacetyl, α-bromo-α-methylbutyryl, α-bromopropionyl, α-chlorobutyryl, α-bromo-α-methylbutyryl, α-chloro-α-chloro-α-methylpropionyl, α-bromohexanoyl, and the like.

The 2-[phenyl(CH₂)]-4-((R¹,R²)-1,3,4,6,7,11b-hexahydro-9,10-dimethoxy-2H-pyrazion[2,1-a]isoquinolines (IV) of this invention are prepared by the method shown in thefollowing reactions, wherein m, R¹ and R² have the meanings given hereinabove, and X is halogen, preferably bromine or chlorine:

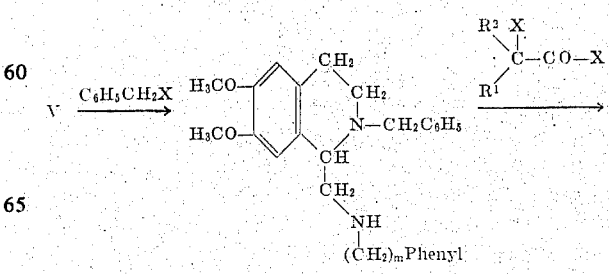

XI

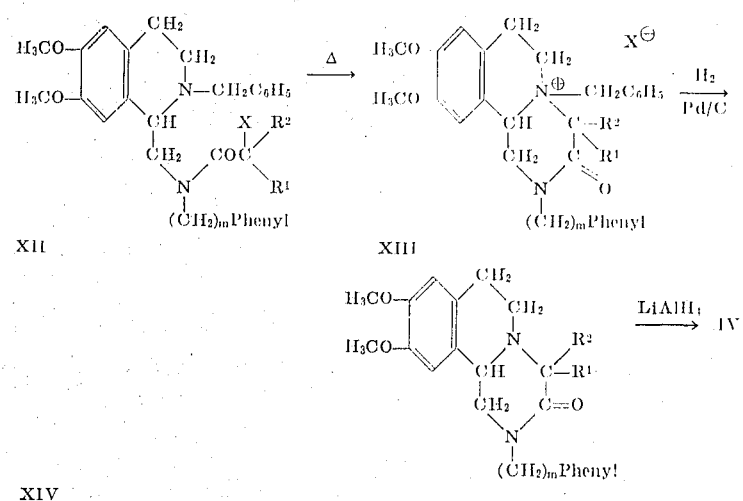

XII

XIII

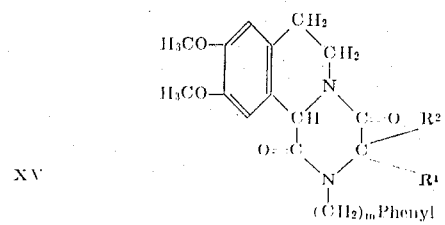

XIV

The intermediate, V, prepared as described hereinabove, is reacted with a phenylmethyl halide in the presence of an acid-acceptor, for example, sodium carbonate or potassium carbonate. The reaction is preferably carried out in refluxing acetonitrile. To the resulting 1-[N-(phenyl($CH_2$)$_M$)]amino-methyl-2-benzyl-1,2,3,4-tetrahydro-6,7-dimethoxyisoquinoline (XI), there is then slowly added at a temperature of about −10°C. an α-halo lower-alkanoyl halide in a solvent inert under the conditions of the reaction. Suitable solvents are, for example, chloroform, methylene dichloride or carbon tetrachloride. The 1-[N-(α-halo lower-alkanoyl)-N-(phenyl($CH_2$)$_M$)]-aminomethyl-2-benzyl-1,2,3,4-tetrahydro-6,7dimethoxyiso-quinoline hydrohalide thus obtained, is converted to its base, XII, by treatment at a temperature of about 0°C. with aqueous alkali, and said base is then heated in a lower-alkanol comprised of from one to three carbon atoms, for example, methanol, ethanol, or isopropanol. Without isolation, the lower-alkanol solution of the cyclized compound, XIII, can be subjected to debenzylation by catalytic hydrogenolyxix to give the carbonyl intermediate XIV, which can be reduced with lithium aluminum hydride to give a compound represented by formula IV.

The 3-oxo-2[phenyl($CH_2$)$_M$].4-($R^1$,$R^2$)-1,3,4,6,7,11b-hexahydro-9,10-dimethoxy-2H-pyrazino[2,1-a] isoquinolines of Formula XIV in addition to having utility as intermediates for the preparation of the 2-[phenyl($CH_2$)$_M$[.4-($R^1$,R)-1,3,4,6,7,11b-hexahydro-9,10-dimethoxy-2[2,1-a]isoquinolines of Formula IV, have been found to possess psychomotor depressant activity when tested according to the method of Dews described above. Exemplary of the 3-oxo intermediates represented by Formula XIV possessing this activity is 3-oxo-2(4-chlorophenyl)-1,3,4,6,7,11b-hexanhydro-9,10-dimethoxy-2H-pyrazion [2,1-a]isoquinoline, described under E–2 in theesection detailing preparation of intermediates hereinbelow. When administered at 300 mg./kg.(P.O.), 3-oxo-2-(4-chlorophenyl)-1,3,4,6,7,11b-hexahydro-9,10-dimethoxy-2H-pyrazion [2,1-a]isoquinoline decreased spontaneous activity by about 60 percent The 2-[phenyl($CH_2$)$_M$[.3-($R^1$,$R^2$)-1,3,4,6,7,11b-hexahydro-9,10-dimethoxy-2H-pyrazin[2,1-a]isoquinolines (III) of our invention can be prepared by lithium aluminum hydride reduction of 1,4-dioxo-2-[phenyl($CH_2$)$_m$].3-($R^1$,$R^2$)-1,3,4,6,7,11b-hexahydro-9,10-dimethoxy-2H-pyrazion[2,1-a]isoquinoline of the formula

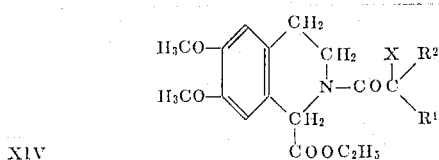

XV wherein m, R hu 1 and $R^2$ have the meanings given hereinabov.

The 1,4-dioxo intermediate supra, is prepared by alternate methods, starting with the known ethyl 1,2,3,4-tetrahydro-6,7-dimethoxy-1-isoquinolinecarboxylate.
In one of the methods, the ester is reacted with α-halo lower-alkanoyl halide, preferably in chloroform solution at a temperature of about −10°C. to about 10°C. followed by refluxing for three to 5 hours. The ethyl 2-(α-halo lower-alkanoyl)-1,2,3,4-tetrahydro-6,7-dimethoxy-1-isoquinolinecarboxylate of the formula

XIV wherein m is zero, one of two and $R^1$ and $R^2$ are hydrogen or lower-alkyl, anX is bromine or chlorine is then reacted with phenyl($CH_2$)$_m$amine, wherein m has the meanings given above, preferably at a temperature of abot 190°C. to 210°C. for a period of thirty to seventy hours in a solvent, inert under the conditions of the reaction to give the 1,4-dioxo intermediate. A preferred solvent is diethylene glycol monoethyl ether.

Another method for the preparation of the 1,4-dioxo intermediate (XV) comprises the reaction of N-[phenyl($CH_2$)$_m$].1,2,3,4-tetrahydro-6,7-dimethoxy-1isoquinolinecarboxamide (VI), described hereinabove, with an α-halo lower-alkanoyl halide in chloroform solution preferably at a temperature of about −10°C. to 10°C. followed by reflux for one to 5 hours. The N-[phenyl($CH_2$)$_M$[.2-(α-halo lower-alkanoyl)-1,2,3,4-tetrahydro-6,7-dimethoxy-1-isoquinolinecarboxamide, thus obtained and having the formula

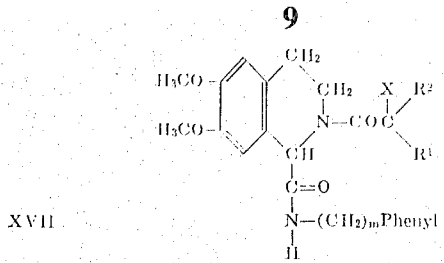

XVII wherein $m$, $R^1$, $R^2$ and $X$ have the meanings given above, is reacted with sodium hydride in a refluxing hydrocarbon solvent, preferably at a temperature of about 75° C. to about 150°C. for one to three hours to obtain the intermediate 1,4-dioxo-2-[phenyl(CH$_3$)$_m$-3-(R$^1$, R$^2$)-1,3,4,6,7,11b-hexahydro-9,10-dimethoxy-2H-pyrazion[2,1-a]isoquinoline (XV).

In addition to being useful as intermediates for the preparation of the 2-[phenyl(CH$_2$)$_m$-3-(R$^3$,R$^2$)-1,3,4,6,7,11b-hexahydro-9,10-dimethoxy-2H-pyrazion[2,1aisoquinolines of Formula XV have been found to substantially decrease spontaneous activity when tested according to the method of Dews described hereinabove. Thus a preferred member of the group of compounds represented by Formula XV, 1,4-dioxo-2-phenylmethyl-1,3,4,6,7,11b-hexahydro-9,10-dimethoxy-2H-pyrazion [2,1-a]-isoquinoline, described under F-10 in the section detailing preparation of intermediates hereinbelow, was found to decrease spontaneous activity by about 64 percent when administered at a dose level of 300 mg./kg. (p.o.).

The novel compounds of the instant invention are the bases represented by the general formulas II, III, and IV as well as the intermediates and derivatives of the intermediates represented by the formulas V through XVII, given hereinabove and the acid-addition salts of said bases, and said acid-addition salts are the full equivalents of the free bases. The compounds of the invention in free base form are converted to the acid-addition salt form by interaction of the base with an acid. Conversely, the free bases can be regenerated from the acid-addition salt form in the conventional manner, that is by treating the salts with strog aqueous bases, for example, alkali metal hydroxides, alkali metal carbonates and alkali metal bicarbonates. The bases thus regenerated can then be interacted with the same or a different acid to give the same or a different acid-addition salt. Thus the novel bases and all of their acid-addition salts are readily interconvertible.

It will thus be appreciated that the general formula shown above not only represents the structural configurations of the bases of our invention but is also representative of the respective structural entity which is common to all of our respective compounds, whether in the form of the free bases or in the form of the acid-addition salts of the bases. We have found that by virtue of this common structural entity, the bases and their acid-addition salts have inherent pharmacodynamic activity of the type described hereinabove. This inherent pharmacodynamic activity can be used for pharmaceutical purposes by employing either the free bases or the acid-addition salts formed with pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, we prefer of course to use pharmaceutically-acceptable salts. Although water-insolubility, high toxicity, or lack of crystalline character may make some particular salt species unsuitable or less desirable for use as such in a given pharmaceutical application, the waterinsoluble or toxic salts can be converted to thecorresponding pharmaceutically-acceptable bases by decomposition of the salt with aqueous base as described above, or altrnatively they can be converted to any desired pharmaceutically-acceptable acid-addition salt by double decomposition reactions involving the anion, for example, by ino-exchange procedures.

Moreover, apart from their usefulness in pharmaceutical applications, our salts are useful as characterizing or identifying derivatives of the free bases or in isolation or purification procedures. Like all of theacid-addition salts, such characterizing or purification salt derivatives can, if desired, be used to regenerate the pharmaceutically-acceptable free bases by reaction of the salts with aqueous base, or alternatively they can be converted to pharmaceutically-acceptable acid-addition salts by, for example, ion-exchange procedures.

It will be appreciated from the foregoing that all of the acid-addition salts of our new bases are useful and valuable compounds, regardless of considerations of solubility, toxicity, physical form, and the like, and are accordingly within the purview of the instant invention.

The novel feature of the compounds of the invention, therefore, resides in the concept of the bases and cationic forms of the new 2-[phenyl(CH$_2$)$_m$].3-(R$^1$,R$^2$)-1,2,3,5,6,10b-hexahydro-8,9-dimethoxy-imidazo[5,1-a]isoquinolines (II), the 2-[phenyl(CH$_2$)$_m$]3(R$^1$,R$^2$)-1,3,4,6,7,11b-hexahydro-9,10-dimethoxy-2H-pyrazion8 2,1-a]isoquinolines (III), and the 2-[phenyl(CH$_2$)$_m$].4-(R$^1$,R$^2$)-1,3,4,6,7,11b-hexahydro-9,10-dimethoxy-2H-pyrazino[2,1a]isoquinolines (IV), the intermediates for the preparation thereof, and derivatives of said intermediates (V through XVII), and not in any particular acid anion associated with the salt forms of the compounds, rather, the acid anions, which can be associated in the salt forms, are in themselves neither novel nor critical and therefore can be any acid anion or acid-like substance capable of salt formation with bases. In fact, in aqueous solutions the base form or water-soluble acid-addition salt form of the compoundof the invention both possess a common protonated cation or ammonium ion The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The compounds can be prepared for use by dissolving, under sterile conditions, a salt form of the compounds in water (or an equivalent amount of a nontoxic acid if the free base is used), or in a physiologically compatible aqueous medium such as saline, and stored in ampoules for use by injection. Alternatively, they can be incorporated in unit dosage form as tablets or capsules for oral administration or in combination with suitable adjuvants such as calcium carbonate, starch, lactose, talc, magnesium stearate, gum acacia, and the like. Still further the compounds can be formulated for oral administration in aqueous alcohol, glycol, oil solution or oil-water emulsions, or other conventional pharmaceutical excipients.

The chemical structures of the compounds of the invention are established by their mode of synthesis and are corroborated by the correspondence between calculated values for the elements and values found by chemical analysis and by concordant spectral properties.

The following procedures and examples will further illustrate specific embodiments of the invention.

PREPARATION OF INTERMEDIATES AND DERIVATIVES THEREOF

A. N-[Phenyl($Ch_2$)$_m$]-2-(R)-1,2,3,4-tetrahydro-6,7-dimethoxy-1-isoquinolinecarboxamides [VI, R=H; VIII, R=Lower-alkyl and phenyl-lower-alkyl; XVII, R=($\alpha$-halo lower-alkanoyl)]

1. A mixture of 2.7 g. (0.01 mole) of ethyl 1,2,3,4-tetrahydro-6,7-dimethoxy-1-isoquinolinecarboxylate and 5.0 ml. (0.05 mole) of aniline was heated to reflux for one and one-half hours while distilling off about 3 ml. of solvent. The residue was taken up in 10 ml. of absolute ethyl alcohol and the solution cooled to give N-phenyl-1,2,3,4-tetrahydro-6,7-dimethoxy-1-isoquinolinecarboxamide which when recrystallized, from absolute ethyl alcohol, melted at 162°–165°C. The hydrochloride salt, prepared by treatment of the free base with an ethyl alcohol solution of anhydrous hydrochloric acid, melted at 237.0°–245.0°C. (dec.)(corr.).

2. Following the procedure described in A-1 hereinabove, but substituting N,N-dimethyl-p-phenylenediamine, in molar equivalent amount for the aniline used in that procedure, there is obtained N-(4-dimethylaminophenyl)-1,2,3,4-tetrahydro-6,7-dimethoxy-1-isoquinolinecarboxamide.

3. A mixture of 4.0 g. (0.015 mole) of ethyl 1,2,3,4-tetrahydro-6,7-dimethoxy-1-isoquinolinecarboxylate and 10.0 ml. (0.1 mole) of benzylamine was refluxed for 17 hours. The mixture was taken up in hot ethyl acetate causing N-phenylmethyl-1,2,3,4-tetrahydro-6,7-dimethoxyl-1-isoquinolinecarboxamide to crystalize spontaneously. Upon collection and recrystallization from boiling ethyl acetate, the product, a white solid, melted at 160°–162°C.

4. When the procedure of A-3 described above is used for the reaction of ethyl 1,2,3,4-tetrahydro-6,7-dimethoxy-1-isoquinolinecarboxylate with phenethylamine, N-phethyl-1,2,3,4-tetrahydro-6,7-dimethoxy-1-isoquinolinecarboxamide is obtained.

5. Using the procedure described in A-1 hereinabove, but substituting 4-(methylthio)aniline for the aniline used in that procedure, there is obtained N-(4-methylthiophenyl)-1,2,3,4-tetrahydro-6,7-dimethoxy-1-isoquinolinecarboxamide.

6. A suspension of 10.6 g. (0.04 mole) of ethyl 1,2,3,4-tetrahydro-6,7-dimethoxy-1-isoquinolinecarboxylate, 6.4 g. (0.05 mole) of 4-chloroaniline and 4.9 g. (0.044 mole) of potassium t-butoxide in 40.0 ml. of toluene was tirred and refluxed for six hours. To the mixture was then added 50 ml. of water. After stirring for one-quarter of an hour, all of the solids had dissolved. The layers were separated and the aqueous layer was extracted with chloroform. The combined organic layers were dried (MgSO$_4$). The solvent was removed and the residual brown oil was taken in 75 ml. of anhydrous ether causing a solid to separate. The solid was collected and recrystallized from boiling absolute ethyl alcohol to give N-(4-chlorophenyl)-1,2,3,4-tetrahydro-6,7-dimethoxy-1-isoquinolinecarboxamide as a white solid m.p. 121.4°–125.8°C. (corr.).

7. Following the procedure of A-6 above, but substituting 4-bromophenylmethylamine for the 4-chloroaniline used in that procedure, there is obtained N-(4-bromophenyl)methyl-1,2,3,4-tetrahydro-6,7-dimethoxy-1-isoquinolinecarboxamide.

8. Substituting 4-methylphenylmethylamine in molar equivalent quantity for 4-chloroaniline, in the procedure described in A-6 hereinabove, there is obtained N-(4-methylphenyl- methyl)-1,2,3,4-tetrahydro-6,7-dimethoxy-1-isoquinolinecarboxamide.

9. Reacting ethyl 1,2,3,4-tetrahydro-6,7-dimethoxy-1-isoquinolinecarboxylate.

10. When 4-butoxyphenethylamine, ethyl 1,2,3,4-tetrahydro-6,7-dimethoxy-1-isoquinolinecarboxylate and potassium t-butoxide are reacted in toluene suspension according to the procedure of A-6 hereinabove, N-(4-butoxyphenethyl)-1,2,3,4-tetrahydro-6,7-dimethoxy-1-isoquinolinecarboxamide is obtained.

11. The reaction of ethyl 1,2,3,4-tetrahydro-6,7-dimethoxy-1-isoquinolinecarboxylate with 3-methoxyphenethyl-amine and in the presence of potassium t-butoxide in a manner analogous to procedure A-6 above, produces N-(3-methoxyphenethyl)-1,2,3,4-tetrahydro-6,7-dimethoxy-1-isoquinoline-carboxamide.

12. A stirred mixture of 9.35 g. (0.03 mole) of N-phenyl-1,2,3,4-tetrahydro-6,7-dimethoxy-1-isoquinolinecarboxamide, 6.14 g. (0.033 mole) of methyl p-toluenesulfonate and 3.8 g. (0.036 mole) of sodium carbonate in 75 ml. of acetonitrile was refluxed for four hours. Chloroform and water were added to the cooled reaction mixture and the layers separated. The equeous layer was extracted with additiona chloroform. The chloroform extracts were dried (MgSO$_4$) and the solvent removed. A white solid remained, which was subjected to recrystallization from boiling absolute ethyl alcohol to give N-phenyl-2-methyl-1,2,3,4-tetrahydro-6,7-dimethoxy-1-isoquinolinecarboxamide, m.p. 175.0°–177.0°C. (corr.).

13. When ethyl 2-methyl-1,2,3,4-tetrahydro-6,7-dimethoxy-1-isoquinolinecarboxylate and aniline are caused to react after the procedure of A-1 as described above, N-phenyl-2-methyl-1,,3,4-tetrahydro-6,7-dimethoxy-1-isoquinolinecarbox-amide, having the same melting point as that obtained in A-12 above, is obtained.

14. The reaction of N-phenethyl-1,2,3,4-tetrahydro-6,7-dimethoxy-1-isoquinolinecarboxamide with benzyl chloride in the presence of sodium carbonate, carried out in refluxing acetonitrile, gives N-phenethyl-2-phenylmethyl-1,2,3,4-tetrahydro-6, 7-dimethoxy-1-isoquinolinecarboxamide.

15. To a stirred, chilled solution of 5.0 g. (0.016 mole) of N-phenyl-1,2,3,4-tetrahydro-6,7-dimethoxy-1-isoquinolinecarboxamede there was added in portions 2.2 ml. (0.03 mole) of chloroacetyl chloride. The reaction solution was tirred at room temperature for fifteen minutes and was then refluxed for one and one-half hours. Water and ether were added to the cooled reaction solution and the aqueous phase drawn off and discarded. The ether layer was washed with water and aqueous sodium carbonate and finally water, after which the ether solution was dried (MgSO$_4$). The solvent was removed to give N-phenyl-2-chloroacetyl-1,2,3,4-tetrahydro-dimethoxy-1-isoquinolinecarboxamide, which upon recrystallization from boiling ethyl acetate was obtained as a white solid, m.p. 182.0-813.0°C. (dec.)(corr.).

16. Following the procedure described in A-15 hereinabove, but substituting N-(4-bromophenyl)methyl-1,2,3,4-tetrahydro-6,7-dimethoxy-1-isoquinolinecarboxamide for N-phenyl-1,2,3,4-tetrahydro-6,7-dimethoxy-1-isoquinolinecarboxamide and substituting 2-bromo-2-methylpropionyl bromide for chloroacetyl chloride there is obtained N-(4-bromophenyl)methyl-2-(2-bromo-2-methylpropionyl)-1,2,3,4-tetrahydro-6,7-dimethoxy-1-isoquinolinecarboxamide.

17. When the above described procedure of A-15 is followed, substituting N-(4-methoxyphenyl)-1,2,3,4-tetrahydro-6,7-dimethoxy-1-isoquinolinecarboxamide for N-phenyl-1,2,3,4-tetrahydro-6,7-dimethoxy-1-isoquinolinecarboxamide and substituting 2-chloro-3-methyl-butyryl chloride for chloroacetyl chloride, there is obtained N-(4-methoxyphenyl)-2-(2-chloro-3-methylbutyryl)-1,2,3,4-tetrahydro-6,7-dimethoxy-1-isoquinolinecarboxamide.

18. The application of procedure A-15 above to the reaction of N-(4-butoxyphenethyl)-1,2,3,4-tetrahydro,6,7-dimethoxy-1-isoquinolinecarboxamide with 2-bromo-2-methylpropionyl bromide, furnishes N-(4-butoxyphenethyl)-2-(2-bromo-2-methylpropionyl)-1,2,3,4-tetrahydro-6,7-dimethoxy-1-isoquinolinecarboxamide.

B. 1-[N-(R$^1$)-N-(phenyl(CH$_2$)$_m$)]aminomethyl-2-(R$^2$)-1,2,3,4-tetrahydro-6,7-dimethoxyisoquinolines [V,R$^1$ and R$^2$=H; IX, R$^1$=H, R$^2$=lower-alkyl; X, R$^1$ and R$^2$=($\alpha$-halo lower-alkanoyl); XII, R$^1$ = ($\alpha$-halo lower-alkanoyl), R$^2$=phenyl-lower-alkyl]

1. A suspension of 3.8 g. (0.1 mole) of lithium aluminum hydride under 250 ml. of tetrahydrofuran was stirred while 16.0 g. (0.052 mole) of N-phenyl-1,2,3,4-tetrahydro-6,7-dimethoxy-1-isoquinolinecarboxamide was added in portions during three minutes. The mixture was stirred and refluxed for 6 hours after which the excess lithium aluminum hydride was carefully destroyed by the addition of 10 ml. of water in 25 ml. of tetrahydrofuran. To the mixture was added b 150 ml. of methylene dichloride and stirring was effected for ten minutes. The solids were filtered off with the aid of diatomaceous earth and the methylene dichloride solution dried (MgSO$_4$). The solvent was removed and the residue crystallized from absolute diethyl ether to give 1-(N-phenyl)aminomethyl-1,2,3,4-tetrahydro-6,7-dimethoxyisoquinoline, m.p. 91°-97°C. The monohydrochloride salt, prepared by treatment of the free base with an ethyl alcohol solution of anhydrous hydrochloric acid, was obtained as a colorless white solid, m.p. 206.0°14 208.0°C. (dec.)(corr.). 2. When 14.6 g. (0.042 mole) of N-(4-chlorophenyl)-1,2,3,4-tetrahydro-6,7-dimethoxy-1-isoquinolinecarboxamide is reduced with 3.0 g. (0.08 mole) of lithium aluminum hydride under 200 ml. of tetrahydrofuran, following the procedure of B-1 above, there is obtained 1-[N-(4-chlorophenyl)]aminomethyl-1,2,3,4-tetrahydro-6,7-dimethoxyisoquinoline as a solid, m.p. 79.5°-82.5°C. Treating the base with an alcoholic solution of anhydrous hydrochloric acid gives the monohydrochloride salt, a colorless solid, m.p. 186.0°-192.4°C. (dec.)(corr.).

Proceeding in the manner described in B-1, using the appropriate N-[phenyl(CH$_2$)$_m$]-2-(R)-1,2,3,4-tetrahydro-6,7-dimethoxy-1-isoquinolinecarboxamide, the following 1-[N-(phenyl-(CH$_2$)$_m$)]aminomethyl-2-(R$^2$)-1,2,3,4-tetrahydro-6,7-dimethoxyisoquinolines are obtained:

3. 1-[N-(4-dimethylaminophenyl)]aminomethyl-1,2,3,4-tetrahydro-6,7-dimethoxyisoquinoline.

4. 1-[N-(4-methylthiophenyl)]aminomethyl-1,2,3,4-tetrahydro-6,7-dimethoxyisoquinoline.

5. 1-[N-(4-methylphenylmethyl)aminomethyl-1,2,3,4-tetrahydro-6,7-dimethoxyisoquinoline.

6. 1-(N-phenethyl)aminomethyl-2-phenylmethyl-1,2,3,4-tetrahydro-6,7-dimethoxyisoquinoline.

7. 1-[N-(4-bromophenylmethyl)]methylamino-1,2,3,4-tetrahydro-6,7-dimethoxyisoquinoline.

8. 1-[N-(4-butoxyphenethyl)]aminomethyl-1,2,3,4-tetrahydro-6,7-dimethoxyisoquinoline.

9. 1-[N-(3-methoxyphenethyl)]aminomethyl-1,2,3,4-tetrahydro-6,7-dimethoxyisoquinoline.

10. A mixture of 6.8 g. (0.023 mole) of 1-(N-phenyl)-aminomethyl-1,2,3,4-tetrahydro-6,7-dimethoxyisoquinoline, 4.84 g. (0.026 mole) of methyl p-toluenesulphonate, and 3.2 g. (0.03 mole) of sodium carbonate in 75 ml. of acetonitrile was stirred and heated at reflux for 4 hours. To the cooled reaction mixture was added water and ether and the organic layer drawn off. The aqueous layer was extracted with chloroform and the combined organic extracts dried. The solvent was removed and the residue was taken up in excess ethyl alcohol solution of anhydrous hydrochloric acid. Upon standing, there separated 1-(N-phenyl)aminomethyl-2-methyl-1,2,3,4-tetrahydro-6,7-dimethoxyisoquinoline in the form of the dihydrochloric acid-addition salt, a colorless solid, m.p. 202.0°-203.0°C. (dec.)(corr.), after recrystallization from methanol.

11. When N-phenyl-2-methyl-1,2,3,4-tetrahydro-6,7-dimethoxy-1-isoquinolinecarboxamide is reduced with lithium aluminum hydride, according to B-1 hereinabove, and the base is treated with excess ethyl alcohol solution of anhydrous hydrochloric acid, there is obtained 1-(N-phenyl)aminomethyl-2-methyl-1,2,3,4-tetrahydro-6,7-dimethoxyisoquinoline in the form of the dihydrochloric acid-addition salt having the same melting poing as that obtained in B-10 above.

12. Following the procedure of B-10 above, 13.3 g. (0.04 mole) of 1-[N-(4-chlorophenyl)]aminomethyl-1,2,3,4-tetrahydro-6,7-dimethoxyisoquinoline, 8.2 g. (0.044 mole) of methyl p-toluenesulphonate and 5.3 g. (0.05 mole) of sodium carbonate in 125 ml. of acetonitrile were reacted to give 1-[N-(4-chlorophenyl)]aminomethyl-2-methyl-1,2,3,4-tetrahydro-6,7-dimethoxyisoquinoline, a colorless solid, m.p. 78.0°-79.0°C., after recrystallization from ether-hexane.

13. To a solution of 23.84 g. (0.08 mole) OF --(N-phenyl)aminomethyl-1,2,3,4-tetrahydro-6,7-dimethoxyisoquinoline in 250 ml. of acetonitrile and containing 10.6 g. (0.1 mole) of sodium carbonate, there was added during 90 minutes in a dropwise manner 10.54 g. (0.083 mole) OF BENZYL CHLORIDE IN -) ML. OF ACETONITRILE. The reaction mixture was stirred and refluxed for four hours after which it was cooled, followed by the addition of water. The acetonitrile layer was separated and the aqueous phase was extracted with chloroform. The combined organic solutions were dried and upon removal of the solvent the residue was taken up in absolute ethyl alcohol and the solution diluted with anhydrous ether. A solid separated and was collected an dried to give 1-(N-phenyl)aminomethyl-2-phenylmethyl-1,2,3,4-tetrahydro-6,7-dimethoxyisoquinoline, m.p. 102°–106 °C. An acetone solution of the base was treated with an excess of an ethyl alcohol solution of anhydrous hydrochloric acid to give the dihydrochloride salt, a colorless solid, m.p. 212.2°–214.0°C. (dec.)(corr.).

14. Using the procedure described in B-13 hereinabove, 41.5 g. ().-0% MOLE) of 1-[N-(4-chlorophenyl)aminomethyl]- 1,2,3,4-tetrahydro-6,7-dimethoxyisoquinoline were treated with 16.5 g. (0.130 mole) of benzyl chloride in 20 ml. of acetonitrile in the presence of 15.9 g. (0.15 mole) of sodium carbonate. The base was treated with an ethyl alcohol solution of anhydrous hydrochloric acid to give 1-[N-(4-chlorophenyl)]aminomethyl-2-phenylmethyl-1,2,3,4-tetrahydro-6,7-dimethoxyisoquinoline dihydrochloride, m.p. 193.0°–194.6°C. (dec.)(corr.).

Following the procedure of B-13 above and employing the appropriate 1-]N-(phenyl($CH_2$)$_m$)]aminomethyl-1,2,3,4-tetrahydro-6.7-dimethoxyisoquinoline, the following 1-[N-(phenyl($CH_2$)$_m$)]-aminomethyl-2-phenylmethyl-1,2,3,4-tetrahydro-6,7-dimethoxyiso-quinolines are obtained.

15.   1-]N-(4-butoxyphenethyl)]aminomethyl-2-phenylmethyl-1,2,3,4-tetrahydro-6,7-dimethoxyisoquinoline.

16.   1-]N-(4-bromophenylmethyl)]aminomethyl-2-phenylmethyl-1,2,3,4-tetrahydro-6,7-dimethoyisoquinoline.

17.   1-[N-(4-dimethylaminophenyl)]aminomethyl-2-phenylmethyl-1,2,3,4-tetrahydro-6,7-dimethoxyisoquinoline.

18.   1-[N-(3-methoxyphenethyl)]aminomethyl-2-phenylmethyl-1,2,3,4-tetrahydro-6,7-dimethoxyisoquinoline.

19. An ice bath cooled solution of 15.52 g. (0.04 mole) of 1-(N-phenyl)aminomethyl-2-phenylmethyl-1,2,3,4-tetrahydro-6,7-dimethoxyisoquinoline in 75 ml. of methylene dichloride was treated with 4.0 ml. (0.053mole) of chloroacetyl chloride over a period of 20 minutes. The cooling bath was removed and after 30 minutes the reaction mixture was refluxed for 20 hours. The reaction mixture was diluted with an equal volume of absolute ether causing 1-[N-(chloroacetyl)-N-(phenyl)]aminomethyl-2-phenylmethyl-1,2,3,4-tetrahydro-6,7- dimethoxyisoquinoline to separate as the monohydrochloride salt, a colorless solid, m.p. 151.0°–154.0°C. (corr.), after recrystallization from ethyl alcohol-ether.

When the procedure of B-19 above is followed in reacting the appropriate --[N-(phenyl($CH_2$)$_m$)]aminomethyl-2-phenylmethyl-1,2,3,4-tetrahydro-6,7-dimethoxyisoquinoline with the appropriate α-halo lower-alkanoyl halide the following compounds named as the free base form, are obtained:

20.   1-[N-(2-bromo-2-methylpropionyl)-N-(4-bromophenylmethyl)]aminomethyl-2-phenylmethyl-1,2,3,4-tetrahydro-6,7-dimethoxyisoquinoline.

21.   --[N-(2-chloro-3-methylbutyrl)-N-(4-butoxyphenethyl)]aminomethyl-2-phenylmethyl-1,2,3,4-tetrahydro-6,7-dimethoxyisoquinoline.

22.   1-[N-(chloroacetyl-N-(4-chlorophenyl)]aminomethyl-2-phenylmethyl-1,2,3,4-tetrahydro-6,7-dimethoxyisoquinoline.

23.   1-[N-(2-chloro-3-methylvaleryl)-N-(3-methoxyphenethyl)]aminomethyl-2-phenylmethyl-1,2,3,4-tetrahydro-6,7-dimethoxyisoquinoline.

24.   1-[N-(2-bromo-2-methylpropionyl)-N-(4-dimethylaminophenyl)]aminomethyl-2-phenylmethyl-1,2,3,4-tetrahydro-6,7-dimethoxyisoquinoline.

25. To a chilled, stirred solution of 2.98 g. (0.01 mole) of 1-(N-phenyl)aminomethyl-1,2,3,4-tetrahydro-6,7-dimethoxyisoquinoline in 50 ml. of methylene dichloride containing 2.3 g. (0.022 mole) of sodium carbonate, there was added over seven minutes 1.13 g. (0.01 mole) of chloroacetyl chloride. The cooling bath was removed and the reaction mixture stirred for thirty minutes, followed by reflux for five hours. The reaction was diluted with water and then extracted with an excess of aqueous hydrochloric acid. The organic layer was separated and dried. The solvent was removed and the residue was taken up in hot absolute ethyl alcohol. On standing 1-[N-(chloroacetyl)-N-(phenyl)]aminomethyl-2-chloroacetyl-1,2,3,4-tetrahydro-6,7-dimethoxyisoquinoline separated, which after collection and recrystallization from boiling absolute ethyl alcohol gave a colorless solid, m.p. 179.0°–180.2°C. (dec.)(corr.).

C. Ethyl 2-(α-halo lower-alkanoyl)-1,2,3,4-tetrahydro-6,7-dimethoxy-1-isoquinolinecarboxylates (XVI)

1. To a stirred solution of 63.0 g. (0.24 mole) of ethyl 1,2,3,4-tetrahydro-6,7-dimethoxy-1-isoquinolinecarboxylate in 360 ml. of chloroform there was added during 45 minutes, 30 ml. (0.40 mole) of chloroacetyl chloride. The cooling bath was removed and stirring continued for one and one-quarter hours after which the reaction was heated at reflux for three hours. The solvent was removed and the residue was taken up in benzene and washed successively with water, aqueous solution of sodium bicarbonate, and finally water. The organic layer was dried and the solvent removed. The residue was taken up in anhydrous ether from which solution ethyl 2-chloroacetyl-1,2,3,4 -tetrahydro-6,7-dimethoxy-1-isoquinolinecarboxylate separated and after collection and recrystallization from boiling absolute ethyl alcohol with the aid of decolorizing charcoal, was obtained as a colorless solid, m.p. 80.6°–84.2 °C. (corr.).

2. Following the procedure described in C–1 above, but substituting 2-bromo-2-methylpropionyl bromide for the chloroacetyl chloride used in that example, there is obtained ethyl 2-(2-bromo-2-methylpropionyl)-1,2,3,4-tetrahydro-6,7-dimethoxy-1-isoquinolinecarboxylate.

3. When 2-chloro-3-methylbutyryl chloride is substituted for chloroacetyl chloride as used in C–1 hereinabove, there is obtained ethyl 2-(2-chloro-3-methylbutyryl)-1,2,3,4-tetrahydro-6,7 -dimethoxy-1-isoquinolinecarboxylate.

4. Using the procedure of C–1 hereinabove, but substituting 2-bromo-2-methylbutyryl bromide for chloroacetyl chloride in reaction with ethyl 1,2,3,4-tetrahydro-6,7-dimethoxy-1-isoquinolinecarboxylate, the product obtained is ethyl 2-(2-bromo-2-methylbutyryl)-1,2,3,4-tetrahydro-6,7-dimethoxy-1-isoquinolinecarboxylate.

5. Following the procedure of C–1 hereinabove, but substituting 2-chloro-3-methylvaleryl chloride for chloroacetyl chloride used in that example, there is obtained ethyl 2-(chloro-3-methylvaleryl)-1,2,3,4-tetrahydro-6,7-dimethoxy-1-isoquinolinecarboxylate.

D. 1-Oxo-2-[phenyl$(CH_2)_m$]-3-$(R^1,R^2)$-1,2,3,5,6,10b-hexahydro-8,9-dimethoxy-imidazo[5,1-a]isoquinolines (VII, $R^1$ and $R^2$=H or lower-alkyl)

1. A mixture of 7.0 g. (0.02 mole) of N-(4-chlorophenyl)-1,2,3,4-tetrahydro-6,7-dimethoxy-1-isoquinolinecarboxamide and 0.720 g. (0.024 mole) of paraformaldehyde in 40 ml. of absolute ethyl alcohol was stirred and refluxed for five hours. Upon cooling and collection, 1-oxo-2-(4-chlorophenyl)-1,2,3,5,6,10b-hexahydro-8,9-dimethoxy-imidazo[5,1-a]isoquinoline was obtained and was subjected to recrystallization from boiling ethyl acetate to give a colorless solid, m.p. 178.6°–182.0°C. (dec.)(corr.).

2. Following the procedure of D–1 above, but substituting, N-phenyl-1,2,3,4-tetrahydro-6,7-dimethoxy-1-isoquinolinecarboxamide for the N-(4-chlorophenyl)-1,2,3,4-tetrahydroe6,7-dimethoxy-1-isoquinolinecarboxamide used therein, there is obtained 1-oxo-2-phenyl-1,2,3,5,6,10b-hexahydro-8,9-dimethoxy-imidazo[5,1-a]isoquinoline.

3. When N-phenylmethyl-1,2,3,4-tetrahydro-6,7-dimethoxy-1-isoquinolinecarboxamide is substituted for N-(4-chlorophenyl)-1,2,3,4-tetrahydro-6,7-dimethoxy-1-isoquinolinecarboxamide and acetaldehyde is substituted for formaldehyde in the procedure D–1 hereinabove, there is obtained 1-oxo-2-phenylmethyl-3-methyl-1,2,3,5,6,10b-hexahydro-8,9-dimethoxyimidazo[5,1-a]isoquinoline.

4. When a solution of 12.4 g. (0.03 mole) of N-(4-butoxyphenethyl)-1,2,3,4-tetrahydro-6,7-dimethoxy-1-isoquinolinecarboxamide and 2.6 g. (0.036 mole) of 2-butanone in 60 ml. of absolute ethyl alcohol is treated according to D–1 above, there is obtained 1-oxo-2-(4-butoxyphenethyl)-3-methyl-3-ethyl-1,2,3,5,6,10b-hexahydro-8,9-dimethoxy-imidazo-[5,1-a]isoquinoline.

5. Following the procedure of D–1 above, but substituting N-(4-bromophenylmethyl)-1,2,3,4-tetrahydro-6,7-dimethoxy-1-isoquinolinecarboxamide for N-(4-chlorophenyl)-1,2,3,4-tetrahydro-6,7-dimethoxy-1-isoquinolinecarboxamide and substituting 3-methyl-2-butanone for formaldehyde used in that procedure, there is obtained 1-oxo-2-(4-bromophenylmethyl)-3-methyl-3-isopropyl-1,2,3,5,6,10b-hexahydro-8,9-dimethoxyimidazo[5,1-a]isoquinoline.

6. Proceeding according to D–1 above, but substituting N-(4-methylthiophenyl)-1,2,3,4-tetrahydro-6,7-dimethoxy-1-isoquinolinecarboxamide for N-(4-chlorophenyl)-1,2,3,4-tetrahydro-6,7-dimethoxy-1-isoquinolinecarboxamide and substituting propionaldehyde for formaldehyde as used in that procedure, there is obtained 1-oxo-2-(4-methylthiophenyl)-3-ethyl-1,2,3,5,6,10b-hexahydro-8,9-dimethoxy-imidazo[5,1-a]isoquinoline.

E. 3-Oxo-2-[phenyl$(CH_2)_m$]-4-$(R^1,R^2)$-1,3,4,6,7,11b-hexahydro-9,10-dimethoxy-2H-pyrazino[2,1-a]isoquinolines. (XIV)

1. A solution of 32 g. of 1-[N-(chloroacetyl)-N-(phenyl)]aminomethyl-2-phenylmethyl-1,2,3,4-tetrahydro-6,7-dimethoxyisoquinoline in 150 ml. of absolute ethyl alcohol was refluxed for sixteen hours. The reaction mixture was then subjected to catalytic hydrogenation using 10 percent palladium on charcoal as the catalyst. The catalyst was removed by filtration and the alcohol solution concentrated in vacuo. The residue was dissolved in water and treated with a slight excess of an aqueous solution of sodium hydroxide. The oil that separated was extracted with chloroform, and the chloroform extract dried. The solvent was removed and the residue recrystallized from boiling absolute ethyl alcohol to give 3-oxo-2-phenyl-1,3,4,6,7,11b-hexahydro-9,10-dimethoxy-2H-pyrazino[2,1-a]isoquinoline, a colorless solid, m.p. 171.8°–173.4°C. (corr.).

2. Following the procedure described in E–1 above, 1-[N-(chloroacetyl)-N-(4-chlorophenyl)]aminomethyl-2-phenylmethyl-1,2,3,4-tetrahydro-6,7-dimethoxyisoquinoline was heated for sixteen hours in absolute ethyl alcohol solution and without isolation, the cyclized product was catalytically reduced to give 3-oxo-2-(4-chlorophenyl)-1,3,4,6,7,11b-hexahydro-9,10-dimethoxy-2H-pyrazino[2,1-a]isoquinoline, m.p. 175.6°–179.6°C. (corr.).

3. Substituting 1-[N-(2-bromo-2-methylpropionyl)-N(4-bromophenylmethyl)]aminomethyl-2-phenylmethyl-1,2,3,4-tetrahydro-6,7-dimethoxyisoquinoline for 1-[N-(chloroacetyl)-N-(phenyl)]aminomethyl-2-phenylmethyl-1,2,3,4-tetrahydro-6,7-dimethoxyisoquinoline, there is obtained by following the procedure of E–1 above, 3-oxo-2-(4-bromophenylmethyl)-4-dimethyl-1,3,4,6,7,11b-hexahydro-9,10-dimethoxy-2H-pyrazino[2,1-a]isoquinoline.

4. Applying the procedure of E-1 hereinabove, to 1-[N-(2-chloro-3-methylbutyryl)-N-(4-butoxyphenethyl)]aminomethyl-2-phenylmethyl-1,2,3,4-tetrahydro-6,7-dimethoxyisoquinoline, gives 3-oxo-2-(4-butoxyphenethyl)-4-isopropyl-1,3,4,6,7,11b-hexahydro-9,10-dimethoxy-2H-pyrazino[2,1-a]isoquinoline.

5. Using the procedure of E-1 hereinabove, but substituting 1-[N-(2-chloro-2-methylbutyryl)-N-(3-methoxyphenethyl)]aminomethyl-2-phenylmethyl-1,2,3,4-tetrahydro-6, 7-dimethoxyisoquinoline for 1-[N-(chloroacetyl)-N-phenyl)] aminomethyl-2-phenylmethyl-1,2,3,4-tetrahydro-6,7-dimethoxyisoquinoline used in that procedure, there is obtained 3-oxo-2-(3-methoxyphenethyl)-4-methyl-4-ethyl-1,3,4,6,7,11b-hexahydro-9,10-dimethoxy-2H-pyrazino[2,1-a]isoquinoline.

6. When 1-[N-(2-bromo-2-methylpropionyl)-N-(4-dimethylaminophenyl)]aminomethyl-2-phenylmethyl-1,2,3,4-tetrahydro-6,7-dimethoxyisoquinoline is substituted for 1-[N-(chloroacetyl)-N-(phenyl)] aminomethyl-2-phenylmethyl-1,2,3,4-tetrahydro-6,7-dimethoxyisoquinoline in the procedure of E-1 described hereinabove, the product obtained is 3-oxo-2-(4-dimethyl-aminophenyl)-4-dimethyl-1,3,4,6,7,11b-hexahydro-9,10-dimethoxy-2H-pyrazino[2,1-a]isoquinoline.

F. 1,4-Dioxo-2-[phenyl$(CH_2)_m$]-3-$(R^1,R^2)$-

1,3,4,6,7,11b-hexahydro-9,10-dimethoxy-2H-pyrazino[2,1-a]isoquinolines (XV)

1. A mixture of 20.5 g. (0.06 mole) of ethyl 2-chloroacetyl-1,2,3,4-tetrahydro-6,7-dimethoxy-1-isoquinolinecarboxylate, 14.0 g. (0.15 mole) of aniline and 10 ml. of diethylene gylcol monoethyl ether was refluxed for thirty hours. To the cooled reaction mixture was added chloroform, water, and an aqueous solution of hydrochloric acid. The chloroform layer was separated and the aqueous layer extracted with additional fresh chloroform. The combined organic extracts were dried and the solvent removed. The residue was recrystallized successively from absolute ethyl alcohol, ethyl acetate, and absolute ethyl alcohol to give 1,4-dioxo-2-phenyl-1,3,4,6,7,11b-hexahydro-9,10-dimethoxy-2H-pyrazino-[2,1-a]isoquinoline, a pale yellow solid, m.p. 177.2°–181.0°C. (corr.).

2. A mixture of 1.68 g. (0.0043 mole) of N-phenyl-2-chloroacetyl-1,2,3,4-tetrahydro-6,7-dimethoxy-1-isoquinolinecarboxamide and 1.0 g. (0.002 mole) of sodium hydride, suspended in 40 ml. of toluene was refluxed for four and one-half hours. To the cooled mixture was carefully added 25 ml. of water and stirring was effected for fifteen minutes. The benzene layer was separated and the aqueous layer extracted with chloroform. The dried organic layer was then concentrated in vacuo and the residue taken up in boiling absolute ethyl alcohol. On cooling 1,4-dixo-2-phenyl-1,3,4,6,7,11b-hexahydro-9,10-dimethoxy-2H-pyrazino[2,1-a]isoquinoline crystallized and after collection and recrystallization from absolute ethyl alcohol was obtained as a pale yellow solid having the same melting point as the material obtained in E-1 above.

3. Following the procedure of E-2, but substituting N-(4-bromophenyl)methyl-2-(2-bromo-2-methylpropionyl)-1,2,3,4-tetrahydro-6,7-dimethoxy-1-isoquinolinecarboxamide for N-phenyl-2-chloroacetyl-1,2,3,4-tetrahydro-6,7-dimethoxy-1-isoquinolinecarboxamide used in that procedure, there is obtained 1,4-dioxo-2-(4-bromophenylmethyl)-3-dimethyl-1,3,4,6,7,11b-hexahydro-9,10-dimethoxy-2H-pyrazino-[2,1-a]isoquinoline.

4. Applying the procedure of F-2 hereinabove to N-(4-methoxyphenyl)-2-(2-chloro-3-methylbutyryl)-1,2,3,4-tetrahydro-6,7-dimethoxy-1-isoquinolinecarboxamide, there is obtained 1,4-dioxo-2-(4-methoxyphenyl)-3-isopropyl-1,3,4,6,7,11b-hexahydro-9,10-dimethoxy-2H-pyrazino[2,1-a]isoquinoline.

5. A mixture of 54.7 g. (0.16 mole) of ethyl 2-chloroacetyl-1,2,3,4-tetrahydro-6,7-dimethoxy-1-isoquinolinecarboxylate and 49.2 g. (0.40 mole) of 2-methoxyaniline in 320 ml. of diethylene glycol monoethyl ether was reacted according to the procedure of F–1 hereinabove to obtain 1,4-dioxo-2-(2—METHOXYPHENYL)-1,3,4,6,7,11b-hexahydro-9,10-dimethoxy-2H-pyrazino[2,1-a]isoquinoline, a colorless solid, m.p. 171.0°–174.0°C. (corr.).

6. Using the procedure of F–1 hereinabove, but substituting 3-methoxyaniline for the aniline used in that procedure there was obtained 1,4-dioxo-2-(3-methoxyphenyl)-1,3,4,6,7,11b-hexahydro-9,10-dimethoxy-2H-pyrazino[2,1-a]isoquinoline,a pale yellow solid, m.p. 136°–142°C.

7. Substituting 4-methoxyaniline for aniline and using the procedure of F–1 described above, 1,4-dioxo-2-(4-methoxyphenyl)-1,3,4,6,7,11b-hexahydro-9,10-dimethoxy-2H-pyrazino[2,1-a]isoquinoline, m.p. 164°–169°C. is obtained.

8. Applying the procedure of F–1 hereinabove, to the reaction of ethyl 2(2-bromo-2-methylbutyryl)-1,2,3,4-tetrahydro-6,7-dimethoxy-1-isoquinolinecarboxylate with 4-dim ethylaminophenethylamine, there is obtained 1,4-dixo-2-(4-dimethylaminophenethyl)-3-methyl-3-ethyl-1,3,4,6,7,11b-hexahydro-9,10-dimethoxy-2H-pyrazino[2,1-a]isoquinoline.

9. Reaction of ethyl 2-(2-chloro-3-methylvaleryl)-1,2,3,4-tetrahydro-6,7-dimethoxy-1-isoquinolinecarboxylate with 4-methylthiophenylmethylamine, according to the procedure F–1hereinabove, gives 1,4-dioxo-2(4-methylthiophenylmethyl)-3-(2-butyl)-1,3,4,6,7,11b-hexahydro-9,10-dimethoxy-2H-pyrazino-[2,1-a]isoquinoline.

10. When 34.2 g. (0.1 mole) of ethyl 2-chloroacetyl-1,2,3,4-tetrahydro-6,7-dimethoxy-1-isoquinolinecarboxylate and 26.8 g. (0.25 mole) of benzylamine in 200 ml. of diethylene glycol monoethyl ether are reacted according to the procedure of F–1 described hereinabove, there is obtained 1,4-dioxo-2-phenylmethyl-1,3,4,6,7,11b-hexahydro-9,10-dimethoxy-2H-pyrazino[2,1-a]isoquinoline as a colorless solid, m.p. 131.0°–132.0°C. (corr.).

11. Following the procedure of F–1, described above, but substituting phenethylamine for aniline used in that procedure, there is obtained 1,4-dioxo-2-phenethyl-1,3,4,6,7,11b-hexahydro-9,10-dimethoxy-2H-pyrazino[2,1-a]isoquinoline as a colorless solid, m.p. 200.5°–205.5°C.

12. Using the procedure of F–1 hereinabove, but substituting ethyl 2-(2-bromo-2-methylbutyryl)-1,2,3,4-tetrahydro-6,7-dimethoxy-1-isoquinolinecarboxylate for ethyl 2-chloroacetyl-1,2,3,4-tetrahydro-6,7-dimethoxy-1-isoquinolinecarboxylate and substituting 4-chlorophenethylamine for aniline used in that procedure, the product obtained is 1,4-dioxo-2-(4-chlorophenethyl)-3-methyl-3-ethyl-1,3,4,6,7,11b-hexahydro-9,10-dimethoxy-2H- pyrazino 2,1-a]isoquinoline.

13. When N-(4-butoxyphenethyl)-2-bromo-2-methylpropionyl)-1,2,3,4-tetrahydro-6,7-dimethoxy-1-isoquinolinecarboxamide is reacted wtih sodium hydride, according to the procedure described in F-2 hereinabove, there is obtained, 1,4-dioxo-2-(4-butoxyphenethyl)-3-dimethyl-1,3,4,6,7,11b-hexahydro-9,10-dimethoxy-2H-pyrazino[2,1-a]isoquinoline.

Example 1

A solution of 5.96 g. (0.02 mole) of 1-(N-phenyl)-aminomethyl-1,2,3,4-tetrahydro-6,7-dimethoxyisoquinoline and 0.72 g. (0.024 mole) of paraformaldehyde in 30 ml. of absolute ethyl alcohol was stirred and refluxed for 6 hours. Approximately one-half of the solvent was removed in vacuo. On standing, 2-phenyl-1,2,3,5,6,10b-hexahydro-8,9-dimethoxy-imidazo[5,1-a]isoquinoline separated and after collection and recrystallization from boiling absolute ethyl alcohol was obtained as a colorless solid, m.p. 106.0°–107.8°C. (corr.).

Example 1a

When 1-oxo-2-phenyl-1,2,3,5,6,10b-hexahydro-8,9-dimethoxy-imidazo[5,1-a]isoquinoline is subjected to reduction of the carbonyl group, using lithium aluminum hydride in tetrahydrofuran, there is obtained 2-phenyl-1,2,3,5,6,10b-hexahydro-8,9-dimethoxy-imidazo[5,1-a]isoquinoline, having the same melting point as that obtained in Example 1 hereinabove.

Example 2

Following the procedure of Example 1 above for the reaction of 3.3 g. (0.01 mole) of 1-[N-(4-chlorophenyl)]aminomethyl-1,2,3,4-tetrahydro-6,7-dimethoxyisoquinoline with 0.36 g. (0.012 mole) of paraformaldehyde in 15 ml. of absolute ethyl alcohol, gives 2-(4-chlorophenyl)-1,2,3,5,6,10b-hexahydro-8,9-dimethoxy-imidazo[5,1-a]isoquinoline, a white solid, m.p. 167.8°-170°C. (corr.).

Example 2a

Lithium aluminum hydride reduction carried out in tetrahydrofuran of 1-oxo-2-(4-chlorophenyl)-1,2,3,5,6,10b-hexahydro-8,9-dimethoxy-imidazo[5,1-a]isoquinoline yields 2-(4-chlorophenyl)-1,2,3,5,6,10b-hexahydro-8,9-dimethoxy-imidazo-[5,1-a]isoquinoline, a colorless solid, m.p. 168.0°-170°C. and shows no melting point depression in admixture with the product from Example 2 above.

Example 3

Employing the procedure of Example 1 hereinabove, but substituting 1-[N-(4-methyphenylmethyl)]aminomethyl1-1,2,3,4-tetrahydro-6,7-dimethoxyisoquinoline for 1-(N-phenyl)-amino methyl-1,2,3,4-tetrahydro-6,7-dimethoxyisoquinoline and substituting acetaldehyde for formaldehyde used in that example, there is obtained 2-(4-methylphenylmethyl)-3-methyl-1,2,3,5,6,10b-hexahydro-8,9-dimethoxy-imidazo[5,1-a]isoquinoline.

Example 4

Reducing 1-oxo-2-(4-butoxyphenethyl)-3-methyl-3-ethyl-1,2,3,5,6,10b-hexahydro-8,9-dimethoxy-imidazo[5,1-a]-isoquinoline with lithium aluminum hydride in tetrahydrofuran produces 2-(4-butoxyphenethyl)-3-methyl-3-ethyl-1,2,3,5,6,10b-hexahydro-8,9-dimethoxy-imidazo[5,1-a]isoquinoline.

Example 5

When the procedure of Example 1 above is applied to the reaction of 1-[N-(4-dimethylaminophenyl)]aminomethyl-1,2,3,4-tetrahydro-6,7-dimethoxyisoquinoline and acetone there is obtained 2-(4-dimethylaminophenyl)-3-dimethyl-1,2,3,5,6,10b-hexahydro-8,9-dimethoxy-imidazo[5,1-a]isoquinoline.

Example 6

The substitution in the procedure of Example 1 hereinabove of 1-[N-(4-methylthiophenyl)]amino methyl-1,2,3,4-tetrahydro-6,7-dimethoxyisoquinoline for 1-(N-phenyl)aminomethyl-1,2,3,4-tetrahydro-6,7-dimethoxyisoquinoline and the substitution of 3-methyl-2-butanone for formaldehyde gives 2-(4-methylthiophenyl)-3-methyl-3-isopropyl-1,2,3,5,6,10b-hexahydro-8,9-dimethoxy-imidazo[5,1-a]isoquinoline.

Example 7

When 1-oxo-2-(4-bromophenylmethyl)-3-methyl-3-isopropyl-1,2,3,5,6,10b-hexahydro-8,9-dimethoxy-imidazo[5,1-a]-isoquinoline is reduced, using lithium aluminum hydride in tetrahydrofuran, there is obtained 2-(4-bromophenylmethyl)-3-methyl-3-isopropyl-1,2,3,5,6,10b-hexahydro-8,9-dimethoxyimidazo[5,1-a]isoquinoline.

Example 8

Lithium aluminum hydride reduction of 1-oxo-2-(4-methylthiophenyl)-3-ethyl-1,2,3,5,6,10b-hexahydro-8,9-dimethoxy-imidazo[5,1-a]isoquinoline, carried out in tetrahydrofuran, yields 2-(4-methylthiophenyl)-3-ethyl-1,2,3,5,6,10b-hexahydro-8,9-dimethoxy-imidazo[5,1-a]isoquinoline.

Example 9

A suspension of 4.6 g. (0.12 mole) of lithium aluminum hydride in 200 ml. of tetrahydrofuran was stirred during the additon of 10.3 g. (0.03 mole) of 3-oxo-2-phenyl-1,3,4,6,7,11b-hexahydro-9,10-dimethoxy-2H-pyrazino-[2,1-a]isoquinoline. The reaction mixture was then heated at reflux for five hours after which 10 ml. of water in 25 ml. of tetrahydrofuran was added. After hydrolysis, the mixture was stirred with 150 ml. of chloroform and then filtered with the aid of diatomaceous earth. The organic layer was dried (MgSO$_4$) and the solvent removed. The residue was taken into acetone and the solution treated with an ethyl alcohol solution of anhydrous hydrochloric acid to give 2-phenyl-1,3,4,6,7,11b-hexahydro-9,10-dimethoxy-2H-pyrazino[2,1-a]isoquinoline dihydrochloride, a light tan solid, m.p. 219.5°-221.0°C. (dec.) (corr.), after recrystallization from ethyl alcohol-ether.

Example 10

Employing a procedure similar to that described in Example 9 and using the appropriate 3-oxo-2-[phenyl(CH$_2$)$_m$]-4 -(R$^1$, R$^2$)-1,3,4,6,7,11b-hexahydro-9,10-dimethoxy-2H-pyrazino[2,1-a]isoquinoline, there are obtained:

a. 2-(4-Chlorophenyl)-1,3,4,6,7,11b-hexahydro-9,10-dimethoxy-2H-pyrazino[2,1-a]isoquinoline, m.p. 158.4°-160.0°C. (corr.).
 b. 2-(4-Bromophenylmethyl)-4-dimethyl-1,3,4,6,7,11b-hexahydro-9,10-dimethoxy-2H-pyrazino[2,1-a]isoquinoline.
 c. 2-(4-Butoxyphenethyl)-4-isopropyl-1,3,4,6,7,11b-hexahydro-9,10-dimethoxy-2H-pyrazino[2,1-a]isoquinoline.
 d. 2-(3-Methoxyphenethyl)-4-methyl-4-ethyl-1,3,4,6,7,11b-hexahydro-9,10-dimethoxy-2H-pyrazino[2,1-a]isoquinoline.
 e. 2-(4-Dimethylaminophenyl)-4-dimethyl-1,3,4,6,7,11b-hexahydro-9,10-dimethoxy-2H-pyrazino[2,1-a]isoquinoline.

Example 11

To a stirred suspension of 3.8 g. (0.1 mole) of lithium aluminum hydride in 150 ml. of tetrahydrofuran was added 7.25 g. (0.019 mole) OF -,$-dioxo-2-phenethyl-1,3,4,6,7,11b-hexahydro-9,10-dimethoxy-2H-pyrazino[2,1-a]isoquinoline. The reaction mixture was refluxed for five hours after which the excess lithium aluminum hydride was decomposed by the addition of 10 ml. of water in 25 ml. of tetrahydrofuran and finally 5 ml. of water. To the mixture, there was then added 200 ml. of chloroform and stirring continued for 15 minutes. Filtration was carried out with the aid of diatomaceous earth and the organic filtrate dried. The solvent was removed and the residue taken into 25 ml. of absolute ethyl alcohol. The alcohol solution was treated with an ethyl alcohol solution of anhydrous hydrochloric acid to give 2-phenethyl-1,3,4,6,7,11b-hexahydro-9,10-dimethoxy-2H-pyrazino-[2,1-a]isoquinoline dihydrochloride, an off-white solid, m.p. 276.0°–278.0°C. (dec.) (corr.), after recrystallization from ethyl alcohol.

Example 12

Following a procedure similar to that described in Example 11, and using the appropriate 1,4-dioxo-2-[phenyl($CH_2$)$_m$-3-($R^1$, $R^2$)-1,3,4,6,7,11b-hexahydro-9,10-dimethoxy-2H-pyrazino-[2,1-a]isoquinoline, there are obtained:

a. 2-Phenylmethyl-1,3,4,6,7,11b-hexahydro-9,10-dimethoxy-2H-pyrazino[2,1-a]isoquinoline dihydrochloride, m.p. 262.8°–264.0°C. (dec.)(corr.).

b. 2-Phenyl-1,3,4,6,7,11b-hexahydro-9,10-dimethoxy-2H-pyrazino[2,1-a]isoquinoline dihydrochloride, m.p. 207°–218°C. (dec.) (corr.). A mixed melting point determination of this compound with that obtained by the procedure of Example 9, shows no melting point depression.

c. 2-(2-Methoxyphenyl)-1,3,4,6,7,11b-hexahydro-9,10-dimethoxy-2H-pyrazino[2,1-a]isoquinoline dihydrochloride, m.p. 225.0°–228.0°C. (dec.) (corr.)

d. 2-(3-Methoxyphenyl)-1,3,4,6,7,11b-hexahydro-9,10-dimethoxy-2H-pyrazino[2,1-a]isoquinoline dihydrochloride, m.p. 198.0–199.8°C. (dec.)(corr.).

e. 2-(4-Methoxyphenyl)-1,3,4,6,7,11b-hexahydro-9,10-dimethoxy-2H-pyrazino[2,1-a]isoquinoline dihydrochloride, m.p. 233.0°–234.5°C. (dec.)(corr.).

f. 2-(4-Bromophenylmethyl)-3-dimethyl-1,3,4,6,7,11b-hexahydro-9,10-dimethoxy-2H-pyrazino[2,1-a]isoquinoline.

g. 2-(4-Methoxyphenyl)-3-isopropyl-1,3,4,6,7,11b-hexahydro-9,10-dimethoxy-2H-pyrazino[2,1-a]isoquinoline.

h. 2-(4-Dimethylaminophenethyl)-3-methyl-3-ethyl-1,3,4,6,7,11b-hexahydro-9,10-dimethoxy-2H-pyrazino[2,1-a]isoquinoline.

i. 2-(4-Methylthiophenylmethyl)-3-(2-butyl)-1,3,4,6,7,11b-hexahydro-9,10-dimethoxy-2H-pyrazino[2,1-a]isoquinoline.

j. 2-(4-Butoxyphenethyl)-3-dimethyl-1,3,4,6,7,11b-hexahydro-9,10-dimethoxy-2H-pyrazino[2,1-a]isoquinoline.

k. 2-(4-Chlorophenethyl)-3-methyl-3-ethyl-1,3,4,6,7,11b-hexahydro-9,10-dimethoxy-2H-pyrazino[2,1-a]isoquinoline.

Our new compounds can exist in stereochemically isomeric forms, that is, optical isomers and geometric isomers. If desired, the isolation or the production of a particular sterochemical form can be accomplished by application of the general principles known in the prior art.

We claim:

1. 1-[N-($R^1$)-N-(Phenyl($CH_2$)$_m$aminomethyl-2-($R^2$)-1,2,3,4-tetrahydro-6,7-dimethoxyisoquinoline of the formula

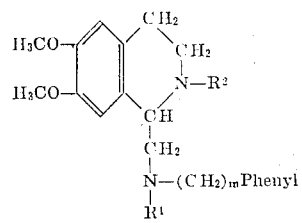

wherein $R^1$ is hydrogen or a α-halo lower-alkanoyl of two to six carbon atoms, and $R^2$ is hydrogen or benzyl; m is zero; and Phenyl is unsubstituted or substituted by a group selected from lower-alkyl of one to four carbon atoms, lower-alkoxy of one to four carbon atoms, halogen, lower-alkylthio of one to four carbon atoms or N,N-di-lower-alkylamino wherein each alkyl has one to four carbon atoms.

2. 1-[N-(Phenyl($CH_2$)$_m$)]aminomethyl-2-($R^2$)-1,2,3,4-tetrahydro-6,7-dimethoxyisoquinoline according to claim 1.

3. 1-(N-Phenyl)aminomethyl-1,2,3,4-tetrahydro-6,7-dimethoxyisoquinoline wherein phenyl is unsubstituted phenyl according to claim 2.

4. 1-[N-(4-Chlorophenyl)]aminomethyl-1,2,3,4-tetrahydro-6,7-dimethoxyisoquinoline according to claim 1.

5. 1-[N-(Phenyl($CH_2$)$_m$)]aminomethyl-2-henzly 1,2,3,4-tetrahydro-6,7-dimethoxyisoquinoline according to claim 2.

6. 1-(N-Phenyl)aminomethyl-2-benzyl-1,2,3,4-tetrahydro-6,7-dimethoxyisoquinoline wherein Phenyl is unsubstituted phenyl according to claim 5.

7. 1-[N-(4-Chlorophenyl)]aminomethyl-2-benzyl1,2,3,4-tetrahydro-6,7-dimethoxyisoquinoline according to claim 5.

8. 1-[N-(α-Halo lower-alkanoyl)-N-(Phenyl($CH_2$)$_m$)]-aminomethyl-2-(benzyl)-1,2,3,4-tetrahydro-6,7-dimethoxyisoquinoline according to claim 5.

9. 1-[N-(Chloroacetyl)-N-phenyl]aminomethyl-2-benzyl-1,2,3,4-tetrahydro-6,7-dimethoxyisoquinoline wherein Phenyl is unsubstituted phenyl according to claim 8.

10. 1-[N-(Chloroacetyl)-N-(4-chlorophenyl)]aminomethyl-2benzyl1,2,3,4-tetrahydro-6,7-dimethoxyisoquinoline according to claim 8.

* * * * *

UNITED STATES PATENT OFFICE
CERTIFICATE OF CORRECTION

Patent No. 3,728,352        Dated    April 17, 1973

Inventor(s) Sydney Archer and John W. Schulenberg

It is certified that error appears in the above-identified patent and that said Letters Patent are hereby corrected as shown below:

Claim 3, line 2, "phenyl" should read --Phenyl--.

Claim 5, line 1, "henzly" should read --benzyl--.

Claim 7, line 2, "benzyl1,2,3,4" should read --benzyl-1,2,3,4--.

Claim 8, line 2, "(benzyl)" should read --benzyl--.

Claim 8, line 3, "claim 5" should read --claim 1--.

Claim 10, line 2, "2benzyl1,2,3,4" should read --2-benzyl-1,2,3,4--.

Signed and sealed this 9th day of July 1974.

(SEAL)
Attest:

McCOY M. GIBSON, JR.
Attesting Officer

C. MARSHALL DANN
Commissioner of Patents